(12) United States Patent
Baluch et al.

(10) Patent No.: US 7,845,457 B2
(45) Date of Patent: Dec. 7, 2010

(54) ADJUSTABLE VEHICLE TRANSMISSION SHIFTERS

(75) Inventors: Stephen William Baluch, Farmington Hills, MI (US); Brandon Dawe, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 352 days.

(21) Appl. No.: 12/040,359

(22) Filed: Feb. 29, 2008

(65) Prior Publication Data

US 2009/0218160 A1    Sep. 3, 2009

(51) Int. Cl.
*B60K 20/06* (2006.01)

(52) U.S. Cl. .................. 180/336; 180/334; 74/473.32

(58) Field of Classification Search .............. 180/336, 180/334, 333; 74/473.1, 473.3, 473.31, 473.32, 74/473.33
See application file for complete search history.

(56) References Cited

U.S. PATENT DOCUMENTS

| | | | | |
|---|---|---|---|---|
| 4,180,713 A | * | 12/1979 | Gonzales | ............ 200/52 R |
| 4,691,587 A | * | 9/1987 | Farrand et al. | ............ 74/493 |
| 6,131,485 A | * | 10/2000 | Raja | ............ 74/562 |
| 6,532,841 B2 | * | 3/2003 | Medico et al. | ............ 74/335 |
| 6,640,661 B2 | | 11/2003 | Duncan et al. | |
| 6,877,394 B2 | | 4/2005 | Massey, III et al. | |
| 6,918,316 B2 | * | 7/2005 | Johansson et al. | ............ 74/512 |
| 6,957,595 B2 | | 10/2005 | Kromer et al. | |
| 7,146,876 B2 | | 12/2006 | Willemsen et al. | |
| 7,217,894 B2 | * | 5/2007 | Miyako et al. | ............ 200/61.54 |
| 7,228,757 B2 | | 6/2007 | Peniston et al. | |
| 7,278,510 B1 | | 10/2007 | Richards | |
| 2005/0103554 A1 | * | 5/2005 | Meglioli | ............ 180/333 |
| 2007/0004549 A1 | * | 1/2007 | Chryssochoos et al. | ..... 475/149 |

* cited by examiner

*Primary Examiner*—Paul N Dickson
*Assistant Examiner*—Drew Brown
(74) *Attorney, Agent, or Firm*—Young Basile

(57) ABSTRACT

Disclosed herein are embodiments of a vehicle transmission shifter and methods of adjusting the vehicle transmission shifter. The vehicle transmission shifter comprises a stalk, a paddle extending from the stalk, and an adjustment mechanism responsive to a driver input to position the paddle in relation to the steering wheel. The paddle is configured to receive a driver's fingers while manually engaging the steering wheel. The method comprises providing driver input to the adjustment mechanism through a user control and adjusting the adjustment mechanism in response to the driver input to position the paddle in relation to the steering wheel.

18 Claims, 3 Drawing Sheets

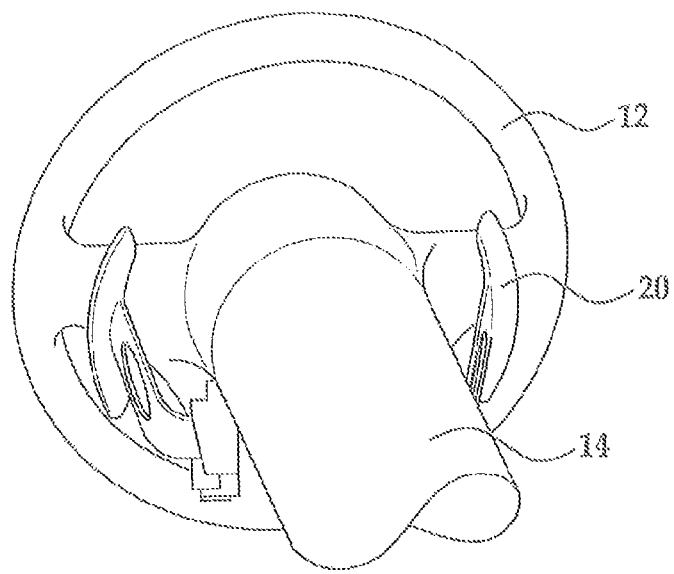
FIG. 3
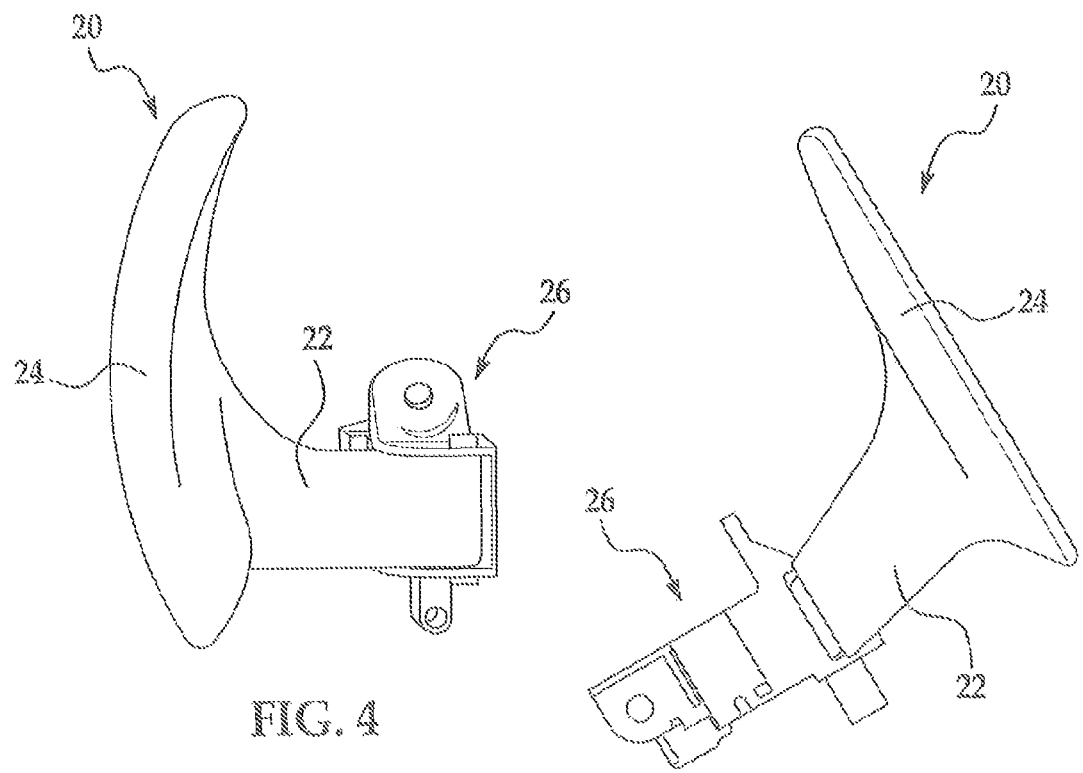
FIG. 4
FIG. 5

ADJUSTABLE VEHICLE TRANSMISSION SHIFTERS

FIELD OF THE INVENTION

The present invention relates to the field of shift devices for a motor vehicle transmission.

BACKGROUND

The use of shifters on the steering wheel of a vehicle is increasing. Typically, there are two shifters similar to paddles on the back of the steering wheel that are used to shift manually without a clutch. Generally, one shifts up, one shifts down. In another example involving a single paddle shifter, pushing the paddle forward with the thumb may drop down a gear, while pulling the paddle towards you with your finger may go into a higher gear. A transmission mode enables the paddles. It is important to be able to operate the paddles without taking both hands off the wheel. The response of the paddles should allow a driver to easily change gears quickly while remaining in complete control of the wheel. As paddle shifters increase in popularity, an increased number of drivers will be using these paddle shifting systems. Drivers of all sizes need to be able to use the paddle shifters with the necessary control and comfort.

SUMMARY

Embodiments of adjustable paddle shifters are disclosed herein. In a first embodiment, a vehicle transmission shifter mounted to a steering column of a steering wheel is disclosed. The vehicle transmission shifter comprises a stalk, a paddle extending from the stalk, and an adjustment mechanism responsive to a driver input to position the paddle in relation to the steering wheel. The paddle is configured to receive a driver's fingers while manually engaging the steering wheel.

Also disclosed are methods of using a vehicle transmission shifter. The vehicle transmission shifter comprises an adjustment mechanism, a stalk, and a paddle. The vehicle transmission shifter is mounted on a steering column of a steering wheel. One disclosed method comprises providing driver input to the adjustment mechanism through a user control and adjusting the adjustment mechanism in response to the driver input to position the paddle in relation to the steering wheel.

BRIEF DESCRIPTION OF THE DRAWINGS

The description herein makes reference to the accompanying drawings wherein like reference numerals refer to like parts throughout the several views, and wherein:

FIG. 3 is a is a rear view of the steering wheel with an embodiment of the vehicle transmission shifters mounted on the steering column;

FIG. 4 is a is front view of an embodiment of a vehicle transmission shifter;

FIG. 5 is a is a side view of the embodiment of FIG. 4;

DETAILED DESCRIPTION

Figure 1:
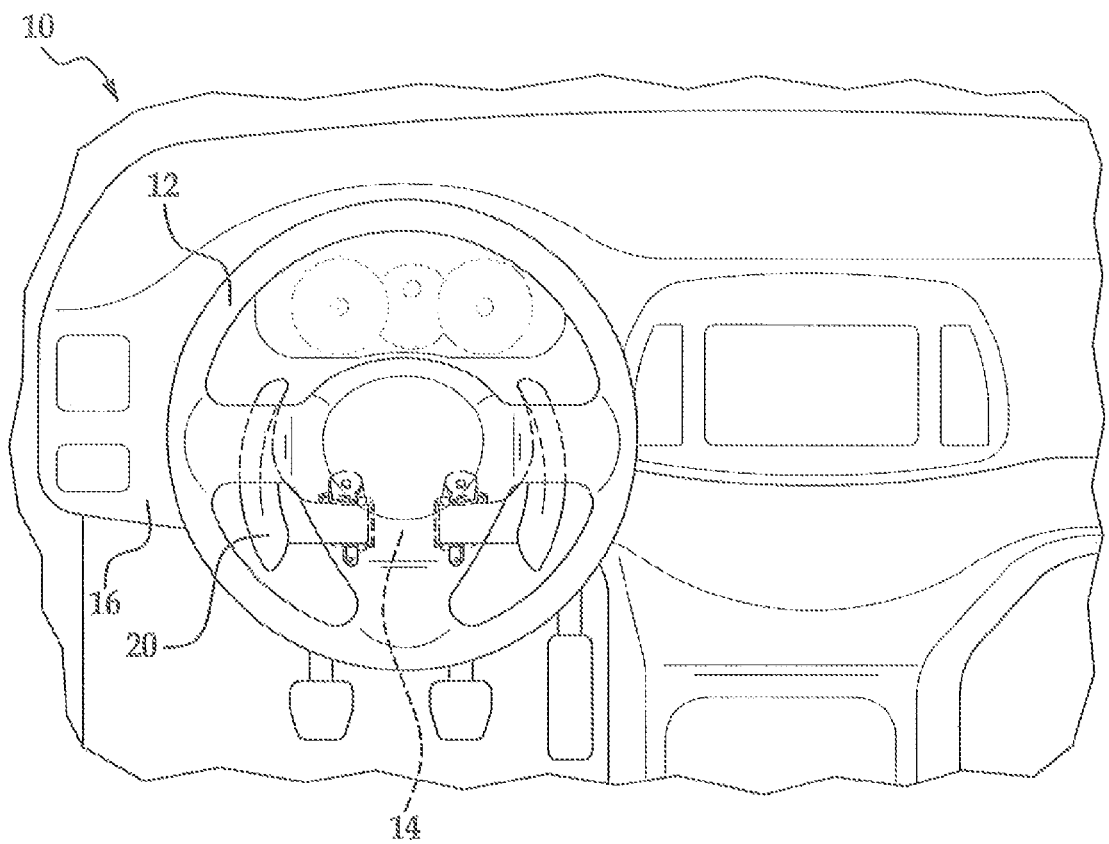
FIG. 1 is a perspective view of an embodiment of the vehicle transmission shifters mounted on a steering column supporting a steering wheel positioned in a vehicle.
Figure 2:
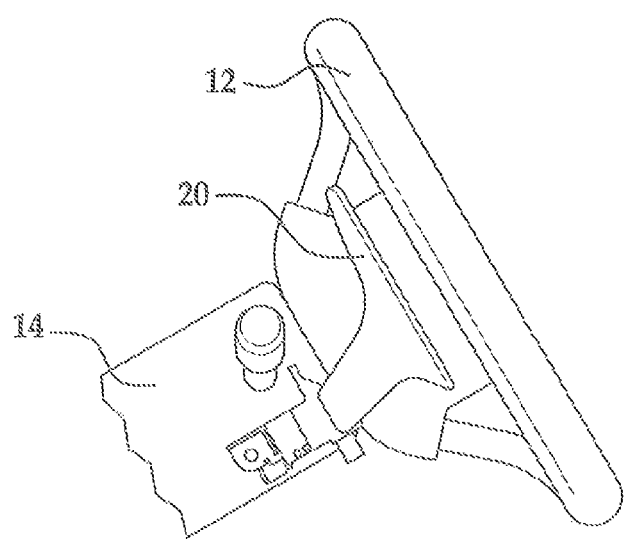
FIG. 2 is a side view of the steering wheel with an embodiment of the vehicle transmission shifter mounted on the steering column.

FIGS. 1-3 illustrate embodiments of the vehicle transmission shifters incorporated into a vehicle. Referring to FIG. 1, a motor vehicle 10 can be steered by a steering wheel 12. Steering wheel 12 is arranged rotatable relative to a steering column 14 with the steering column 14 extending from a dash board 16, as is well known in the art. Mounted on the steering column 14 is at least one vehicle transmission shifter 20. FIG. 2 more clearly depicts the vehicle transmission shifter 20 mounted to the steering column 14. The vehicle transmission shifter 20 is configured such that it is positioned behind the steering wheel 12 but within a driver's finger reach while the driver is manually engaging the steering wheel 12. FIG. 3 is a rear view of the steering wheel 12 and the steering column 14 with a pair of vehicle transmission shifters 20 mounted to the steering column 14.

Vehicle transmission shifters 20 can be implemented in any vehicle with a transmission that transfers power from a power source to the driving wheels. At least one vehicle transmission shifter 20 is mounted to a steering column 14. It is contemplated that two vehicle transmission shifters 20 can be used to shift the transmission of the vehicle 10. As used herein, "steering column 14" refers to any area between the steering wheel gripping portion 12 and the dashboard 16 to which the vehicle transmission shifters 20 may be mounted.

FIG. 4 depicts a first embodiment of a vehicle transmission shifter 20. Vehicle transmission shifter 20 comprises a stalk 22, a paddle 24 extending from the stalk 22, and an adjustment mechanism 26 which adjustably attaches the stalk 22 to the steering column 14. FIG. 5 is a side view of the first embodiment of the vehicle transmission shifter 20. Paddle 24 of the first embodiment is integral with the stalk 22. Adjustment mechanism 26 is mounted between the stalk 22 and the steering column 14 so that adjustment mechanism 26 moves both the stalk 22 and the paddle 24 as one in relation to the steering wheel 12.

The stalk 22 can extend from the paddle 24 at different angles than that shown in the figures. Also, the shape of the paddle 24 depicted in the figures is provided by way of example and not limitation, and other suitable paddle shapes known in the art may be used.

The adjustment mechanism 26 can be mounted to the steering column 14 in any suitable way known in the art. Non-limiting examples include fasteners such as bolts and screws. The adjustment mechanism 26 is responsive to a driver's input to position the paddle 24 integral with the stalk 22. The paddle 24 is positioned in relation to the steering wheel 12 as desired by the driver so that the driver can operate the vehicle transmission shifter 20 while manually engaging the steering wheel 12. Because the driver must maintain control of the steering wheel 12 while driving and shifting, the vehicle transmission shifters 20 can be positioned relative to the steering wheel 12 to allow maintenance of that control.

Drivers of vehicles have palms and fingers ranging in dimension. Drivers also hold the steering wheel 12 in different preferred positions. These positions have been described using a clock analogy. One example of a driver's hand position on the steering wheel 12 is the "ten o'clock and two o'clock" position. Another may be the "seven o'clock and five o'clock" position. Yet another may be the "nine o'clock and three o'clock" position. Because of the vast combinations of drivers' hand dimensions and preferred hand locations on the steering wheel 12, a fixed location of vehicle transmission shifters 20 on a steering column can be prohibitive of their use as not all drivers can manually engage the steering wheel 12 while shifting.

The adjustment mechanism 26 can move the integral paddle 24 and stalk 22 in a side-to-side direction, meaning toward the driver's door and toward a passenger's door. The adjustment mechanism 26 can also move the integral paddle 24 and stalk 22 forward and back, meaning toward the driver and toward the dash board 16. The adjustment mechanism can also move the integral paddle 24 and stalk 22 up and down, meaning toward the roof of the vehicle 10 and toward the floor of the vehicle 10. It is contemplated that embodiments of the adjustment mechanism 26 may move the paddle 24 and stalk 22 in one of these directions. It is further contemplated that embodiments of the adjustment mechanism 26 may move the paddle 24 and stalk 22 in any two of these directions. It is also contemplated that embodiments of the adjustment mechanism 26 may move the paddle 24 and stalk 22 in all of these directions.

Figure 6:
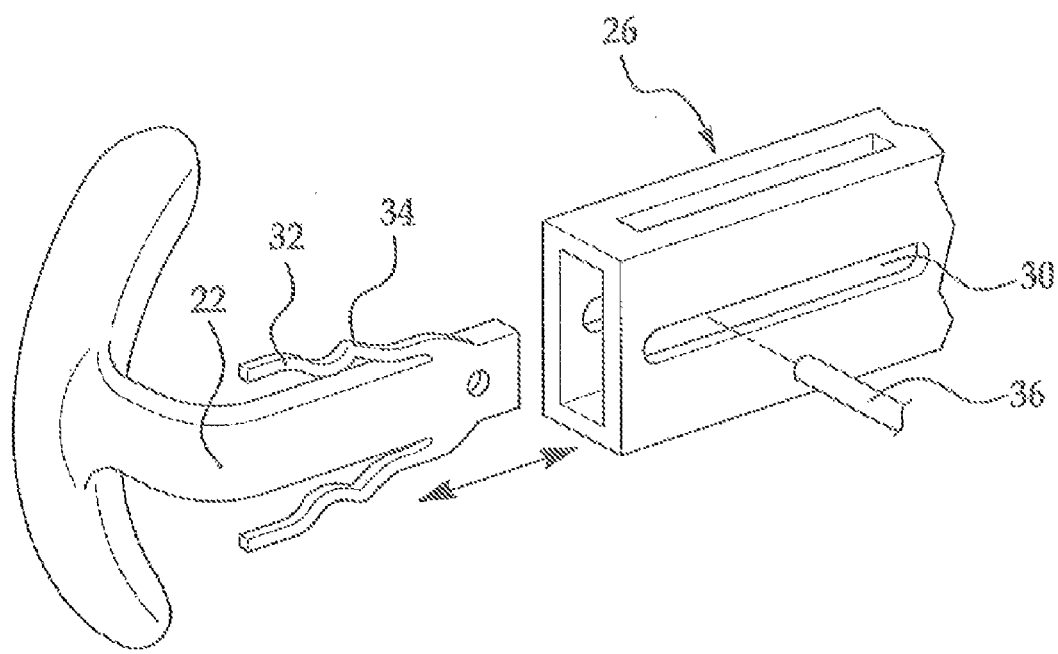
FIG. 6 is a side view of another embodiment of a vehicle transmission shifter.

The adjustment mechanism 26 can be mechanically operated. For example, the adjustment mechanism 26 may comprise at least one track 30 and the stalk 22 may have at least one mating pawl 32 coupled to the track 30, as shown in FIG. 6. The pawl 32 may have one or more pinch points 34, such that when the pawl 32 is manually moved along the track 30, the pinch point 34 locks the pawl 32 at sectors within the track 30. A pin 36 through the track 30 and end of stalk 22 can be used to limit the movement of the stalk 22.

Another example of a mechanical adjustment mechanism 26 is a locking pivot wherein the stalk 22 pivots around the locking pivot. The adjustment mechanism 26 includes stops that receive a pin on the stalk, wherein the stop retains the pin to fixedly retain the stalk 22 in the chosen position. Yet another example of a mechanical adjustment mechanism 26 has a receiver with a pawl. The receiver receives the stalk 22. The stalk 22 can be rotated within the adjustment mechanism 26 with the pawl fixedly positioning the stalk 22 at predetermined stops around the circumference of the stalk 22. The pawl can be on the stalk 22 and the stops can be on the adjustment mechanism 26. It is contemplated that one or more mechanical adjustment configurations may be incorporated into the adjustment mechanism 26 of the vehicle transmission shifters 20 to vary the range of movement as required or desired. These mechanical adjustment configurations are provided by way of example and not limitation, and other suitable mechanical adjustment configurations known in the art may be used.

The adjustment mechanism 26 can also be electrically operated. For example, the adjustment mechanism 26 may comprise an actuator with a user control switch responsive to the actuator located in close relation, such as on the stalk 22 or paddle 24. The actuator would position the paddle 24 about at least one axis in response to the user's use of the control switch. It is contemplated that the actuator can move the paddle 24 about more than one axis for a broader range of motion. The actuator may be, for example, a stepper motor. These electrical adjustment configurations are provided by way of example and not limitation, and other suitable electrical adjustment configurations known in the art may be used. It is contemplated that an electrical input system may include memory means, such that one or more positions are stored after input, allowing the user to simply designate the stored position of the paddle 24 when preparing to drive.

Figure 7:
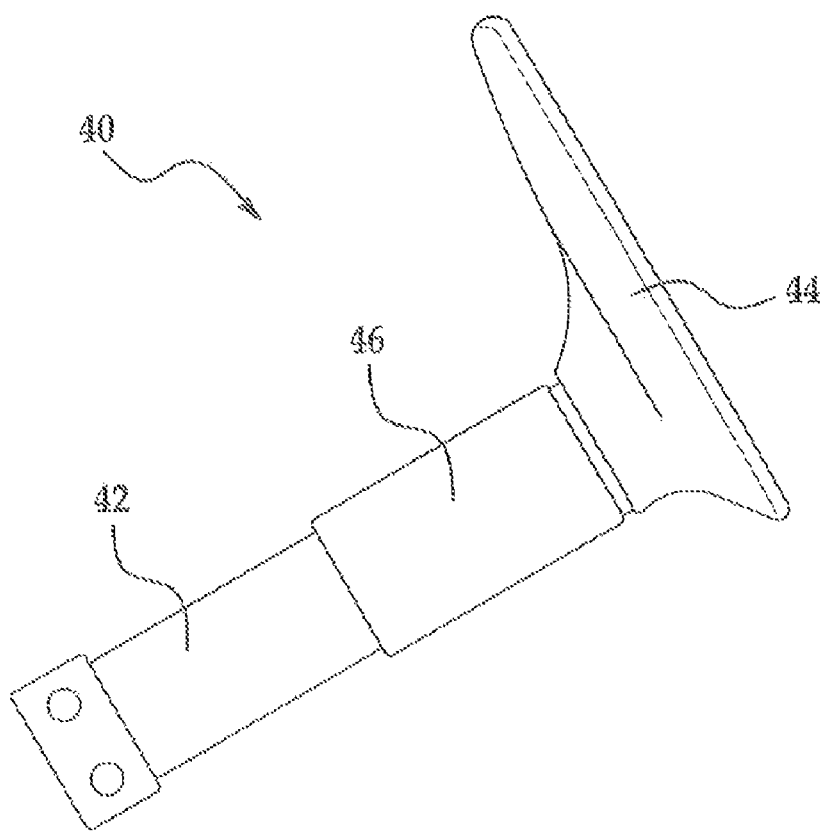
FIG. 7 is a side view of another embodiment of a vehicle transmission shifter.

A second embodiment of a vehicle transmission shifter 20 taught herein is shown in FIG. 7. Vehicle transmission shifter 40 comprises a stalk 42 mountable to the steering column 14, a paddle 44, and an adjustment mechanism 46 which adjustably attaches the paddle 44 to the stalk 42. Paddle 44 of the second embodiment is not integral with the stalk 42 but rather is separated from the stalk 42 by the adjustment mechanism 46. Adjustment mechanism 46 moves the paddle 44 in relation to the steering wheel 12 while the stalk 42 remains stationary. As in the first embodiment, the shape of the paddle 44 depicted in FIG. 7 is provided by way of example and not limitation, and other suitable paddle shapes known in the art may be used. The stalk 42 can be mounted to the steering column 14 in any suitable way known in the art. Non-limiting examples include fasteners such as bolts and screws.

As in the first embodiment, the adjustment mechanism 46 of the second embodiment is responsive to a driver's input to position the paddle 44 in relation to the steering wheel 12 as desired by the driver so that the driver can move the vehicle transmission shifter 40 while manually engaging the steering wheel 12. The adjustment mechanism 46 can move the paddle 44 in a side-to-side direction, meaning toward the driver's door and toward a passenger's door. The adjustment mechanism 46 can also move the paddle forward and back, meaning toward the driver and toward the dash board 16. The adjustment mechanism 46 can also move the paddle up and down, meaning toward the roof of the vehicle 10 and toward the floor of the vehicle 10. It is contemplated that embodiments of the adjustment mechanism 46 may move the paddle 44 and stalk 42 in one of these directions. It is further contemplated that embodiments of the adjustment mechanism 46 may move the paddle 44 and stalk 42 in any two of these directions. It is also contemplated that embodiments of the adjustment mechanism 46 may move the paddle 44 and stalk 42 in all of these directions.

The adjustment mechanism 46 can be mechanically or electrically operated in the same manner as described with respect to the first embodiment.

A method of using the embodiments of vehicle transmission shifters 20, 40 taught herein is disclosed. The method comprises providing driver input to the adjustment mechanism 26, 46 through a user control and adjusting the adjustment mechanism 26, 46 in response to the driver input to position the paddle 24, 44 in relation to the steering wheel 12. As discussed above, the driver input may be manual or may be through a control switch. The adjustment mechanism 26, 46 may operate mechanically or electrically, as described herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle transmission shifter mounted to a steering column of a steering wheel comprising:
    a stalk;
    a paddle extending from the stalk, the paddle configured to receive a driver's fingers while manually engaging the steering wheel; and
    an adjustment mechanism responsive to a driver input to position the paddle at a plurality of locations along one or more axes in relation to the steering wheel to maintain contact between a driver's hands and the steering wheel during shifting, wherein the paddle is configured to shift the transmission in response to movements of the paddle by the driver in the same manner in each of the plurality of locations once the paddle is positioned by the adjustment mechanism.

2. The vehicle transmission shifter of claim 1, wherein the paddle is integral with the stalk and the adjustment mechanism is mounted between the stalk and the steering column, the adjustment mechanism integrally moving the stalk and paddle in relation to the steering wheel.

3. The vehicle transmission shifter of claim 2, wherein the adjustment mechanism comprises at least one track and the stalk comprises at least one releasable pawl coupled to the track to fixedly position the paddle.

4. The vehicle transmission shifter of claim 1, wherein the stalk is mounted to the steering column and the adjustment mechanism is mounted between the stalk and the paddle, the adjustment mechanism moving the paddle in relation to the steering wheel.

5. The vehicle transmission shifter of claim 1, wherein the adjustment mechanism is mechanically operated.

6. The vehicle transmission shifter of claim 1, wherein the adjustment mechanism is electrically operated with a user control switch located on one of the stalk and the paddle.

7. The vehicle transmission shifter of claim 1, wherein the adjustment mechanism comprises an actuator and one of the stalk and the paddle comprises a user control switch, the actuator being responsive to the user control switch to position the paddle along or about an axis.

8. The vehicle transmission shifter of claim 7, wherein the actuator is at least one stepper motor.

9. The vehicle transmission shifter of claim 7 further comprising memory means, wherein one or more positions along or about the axis are stored in the memory means, wherein the user control switch designates a stored position.

10. A vehicle steering wheel comprising at least one of the vehicle transmission shifter of claim 1.

11. A method of using a vehicle transmission shifter comprising an adjustment mechanism, a stalk, and a paddle, wherein the vehicle transmission shifter is mounted on a steering column of a steering wheel, the method comprising:

providing driver input to the adjustment mechanism;

adjusting the paddle to one of a plurality of positions in relation to the steering wheel with the adjustment mechanism in response to the driver input, the positions configured such that a driver's hand maintains contact with the steering wheel while a driver's fingers contacts the paddle; and shifting the transmission with the paddle when the paddle is in any one of the plurality of positions.

12. The method of claim 11, wherein the paddle is integral with the stalk and the adjustment mechanism is mounted between the stalk and the steering column, the adjustment mechanism integrally adjusting the stalk and paddle in relation to the steering wheel.

13. The method of claim 11, wherein the stalk is mounted to the steering column and the adjustment mechanism is mounted between the stalk and the paddle, the adjustment mechanism adjusting the paddle in relation to the steering wheel.

14. The method of claim 11, wherein the driver input is a mechanical input.

15. The method of claim 11, wherein the driver input is an electrical input received through a user control located on one of the paddle or the stalk.

16. The method of claim 11, wherein the driver input is received by a control switch located on one of the paddle and the stalk and the adjustment mechanism is an actuator responsive to the control switch, the adjusting step comprising moving the paddle along or about an axis.

17. The method of claim 16, wherein the actuator is a stepper motor.

18. The method of claim 11, wherein the adjustment mechanism comprises at least one track and the stalk comprises at least one releasable pawl coupled to the track to fixedly position the paddle, and the adjusting step comprises moving the releasable pawl along the track.

\* \* \* \* \*